United States Patent
Knoop et al.

(10) Patent No.: US 11,547,881 B2
(45) Date of Patent: Jan. 10, 2023

(54) WIND TURBINE AND METHOD FOR SUCTIONING SMOKE IN A WIND TURBINE

(71) Applicant: Wobben Properties GmbH, Aurich (DE)

(72) Inventors: Frank Knoop, Aurich (DE); Ihno Coordes, Ihlow (DE); Jörg Grünhagel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 861 days.

(21) Appl. No.: 16/468,202

(22) PCT Filed: Nov. 10, 2017

(86) PCT No.: PCT/EP2017/078850
§ 371 (c)(1),
(2) Date: Jun. 10, 2019

(87) PCT Pub. No.: WO2018/108402
PCT Pub. Date: Jun. 21, 2018

(65) Prior Publication Data
US 2020/0078622 A1    Mar. 12, 2020

(30) Foreign Application Priority Data
Dec. 12, 2016 (DE) .................. 10 2016 124 016.8

(51) Int. Cl.
*A62C 3/00* (2006.01)
*F03D 17/00* (2016.01)
(Continued)

(52) U.S. Cl.
CPC ............... *A62C 3/00* (2013.01); *F03D 17/00* (2016.05); *F03D 80/50* (2016.05); *F03D 80/80* (2016.05);
(Continued)

(58) Field of Classification Search
CPC . F24F 7/013; F24F 11/34; F03D 80/00; F03D 80/50; F03D 80/60; F03D 80/80; A62C 3/00
See application file for complete search history.

(56) References Cited

U.S. PATENT DOCUMENTS 6,036,595 A * 3/2000 Vole .................... F24F 11/0001
454/343
7,372,171 B2   5/2008 Wobben
(Continued)

FOREIGN PATENT DOCUMENTS

AU         2007200375 A1    2/2007
CN         103656930 A      3/2014
(Continued)

*Primary Examiner* — Richard A Edgar
(74) *Attorney, Agent, or Firm* — Seed Intellectual Property Law Group LLP

(57) ABSTRACT

A wind turbine comprising a tower, a pod, at least one smoke detector in the region of the tower and/or in the region of the pod, at least one fan arranged in the tower and/or in the pod, and a control unit which detects a fire situation or smoke development in the wind turbine by means of the smoke detectors and activates the fans disposed in the tower and/or in the pod in order to suck away the smoke produced.

8 Claims, 3 Drawing Sheets

(51) Int. Cl.
  *F03D 80/50*   (2016.01)
  *F03D 80/80*   (2016.01)
  *F24F 11/33*   (2018.01)
  *G08B 17/10*   (2006.01)

(52) U.S. Cl.
  CPC .............. *F24F 11/33* (2018.01); *G08B 17/10* (2013.01); *F05B 2260/64* (2013.01); *F05B 2260/80* (2013.01); *F05B 2270/107* (2013.01)

(56) References Cited

U.S. PATENT DOCUMENTS

| | | | |
|---|---|---|---|
| 9,316,204 | B2 | 4/2016 | Fricke et al. |
| 9,458,824 | B2 | 10/2016 | Giertz et al. |
| 9,650,795 | B2 | 5/2017 | Holscher et al. |
| 2011/0138699 | A1 | 6/2011 | Niehues et al. |
| 2013/0309088 | A1 | 11/2013 | Steen |
| 2016/0025072 | A1 | 1/2016 | Monteiro de Barros |
| 2017/0022979 | A1 | 1/2017 | Teichert |
| 2018/0038351 | A1* | 2/2018 | Jacobsen .................. H02K 9/04 |

FOREIGN PATENT DOCUMENTS

| | | | | |
|---|---|---|---|---|
| DE | 29706030 | U1 | 8/1997 | |
| DE | 10062405 | A1 | 7/2002 | |
| DE | 102010015075 | A1 * | 10/2011 | ............. E04H 12/28 |
| DE | 102011100769 | A1 * | 3/2012 | ........... B66B 13/165 |
| EP | 1122425 | A1 | 8/2001 | |
| JP | 2005522239 | A | 7/2005 | |
| JP | 2011089469 | A * | 5/2011 | |
| KR | 20060106934 | A | 10/2006 | |
| KR | 101291177 | B1 | 7/2013 | |
| KR | 101400201 | B1 * | 5/2014 | ............. F03D 13/20 |
| RU | 2564734 | C2 | 10/2015 | |
| RU | 2598475 | C2 | 9/2016 | |
| WO | 2015/078480 | A1 | 6/2015 | |
| WO | WO-2017162249 | A1 * | 9/2017 | ............... A62B 1/02 |

* cited by examiner

WIND TURBINE AND METHOD FOR SUCTIONING SMOKE IN A WIND TURBINE

BACKGROUND

Technical Field

The present invention concerns a wind turbine and a method of sucking away smoke in a wind turbine.

Description of the Related Art

Wind turbines typically have a large number of electrical and in particular power-electronic units both in the pod and also in the lower region of the tower. For example a generator and a rectifier can be disposed in the pod while an inverter, other power-electronics units and for example a transformer can be provided in the lower region of the tower. In order to prevent the spread of fire or smoke, smoke protection covers or fire protection covers can be provided in the tower of the wind turbine.

However, smoke protection covers or fire protection covers are expensive to manufacture or fit in place.

On the German patent application from which priority is claimed the following documents were searched: DE 100 62 405 A1, WO 2015/078480 A1 and US 2011/0138699 A1.

BRIEF SUMMARY

Provided is a wind turbine comprising a tower, a pod, at least one smoke detector in the region of the tower and/or in the region of the pod, at least one fan which is arranged in the tower and/or in the pod, and a control unit which detects a fire situation or the development of smoke in the wind turbine by means of the fire detector and activates the fans disposed in the tower and/or in the pod to suck away to the exterior the smoke produced. This is effected in particular when there are people in the wind turbine to prevent the people suffering from smoke inhalation poisoning. If maintenance of the wind turbine is being implemented then the wind turbine can be switched into a maintenance mode and the control unit can activate the fans in the case of smoke production.

According to an aspect of the present invention an evacuation platform is provided on the tower.

According to another aspect of the present invention, an access door is provided in the tower. The control unit can control the at least one fan in dependence on whether the access door has been opened.

According to a further aspect of the present invention an opening is provided in the tower and/or an opening in the pod, wherein the smoke can be sucked away through the opening in the pod.

Provided is a wind turbine having a smoke extraction installation in the interior of the wind turbine, for example in the tower and/or in the pod of the wind turbine. The smoke extraction installation can for example use the fan disposed in the wind turbine to suck smoke for example from the lower tower region or in the pod to the exterior.

Optionally, in addition to the already existing fan for cooling the power-electronics generator or the transformer, additional fans can be installed to permit effective extraction of smoke which develops in the wind turbine.

The disclosure concerns in particular a situation where maintenance or service personnel are in the wind turbine when a fire occurs. In such a case it is necessary to ensure that the service personnel or the maintenance personnel are evacuated from the wind turbine as quickly as possible. As smoke poisoning is the most common cause of death in fire situations, the disclosure seeks to make it possible to suck away smoke as effectively as possible. For enhanced safety the fans used can have an uninterruptible power supply.

The wind turbine according to the invention is advantageous because for example it is possible to dispense with fire protection covers or smoke protection covers.

Further embodiments of the invention are the subject-matter of the appendant claims.

BRIEF DESCRIPTION OF THE SEVERAL VIEWS OF THE DRAWINGS

Advantages and embodiments by way of example of the invention are described hereinafter with reference to the drawing.

DETAILED DESCRIPTION

Figure 1:
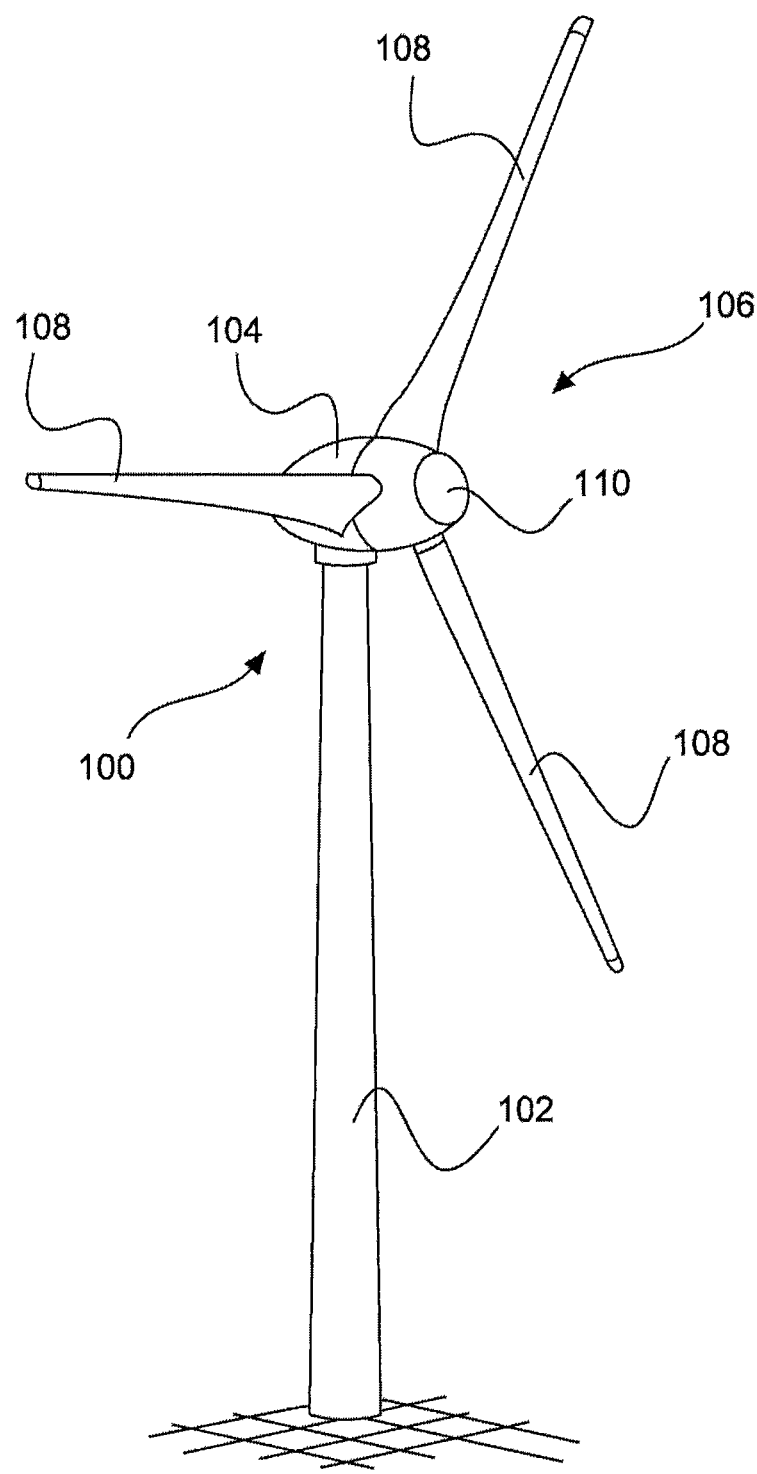
FIG. 1 shows a diagrammatic view of a wind turbine according to the invention.

FIG. 1 shows a diagrammatic view of a wind turbine according to the invention. FIG. 1 shows a wind turbine 100 with a tower 102 and a pod 104. A rotor 106 having three rotor blades 108 and a spinner 110 is arranged at the pod 104. In operation the rotor 106 is set in rotation by the wind and thereby drives a generator in the pod 104.

Figure 2:
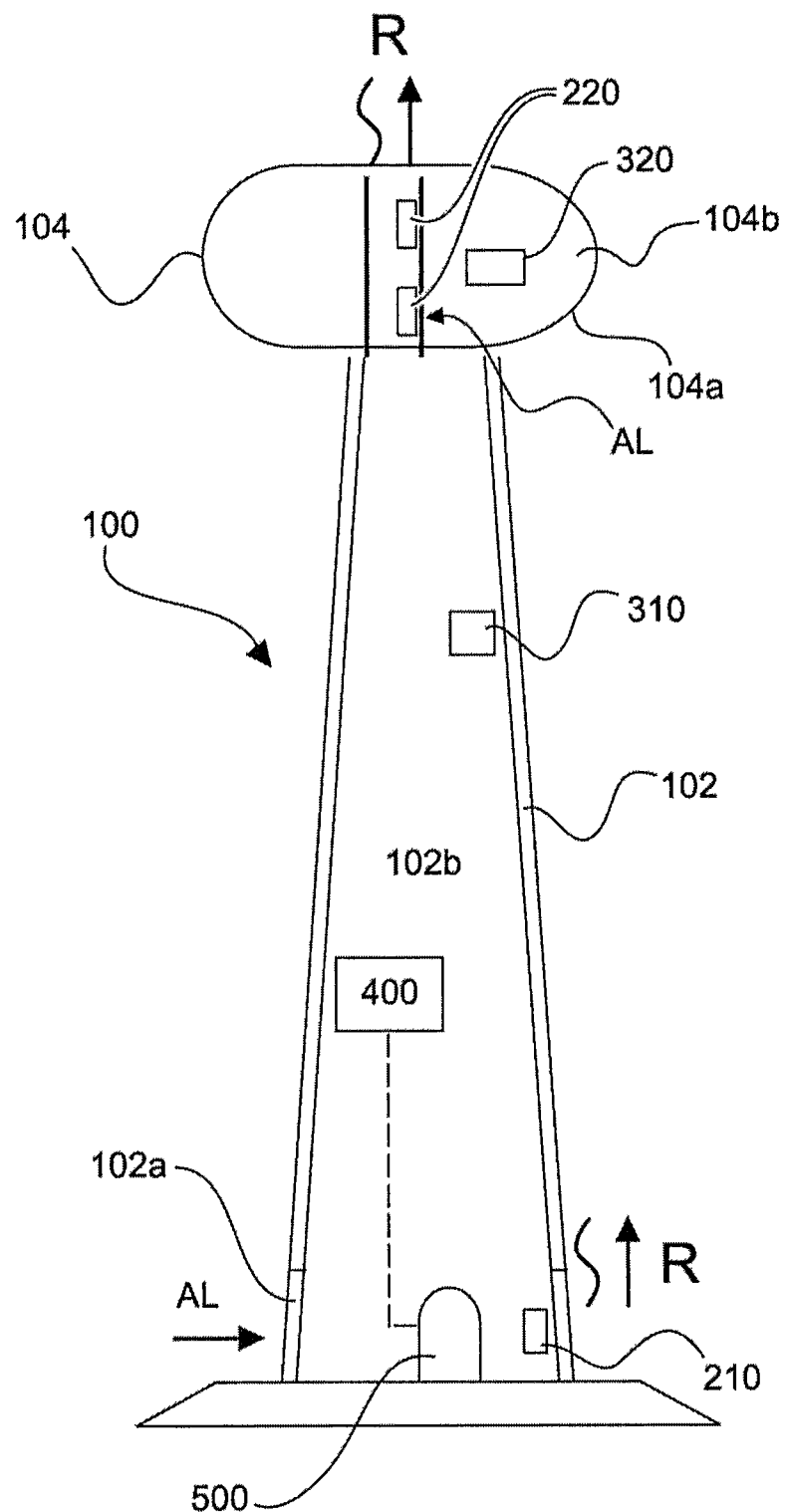
FIG. 2 shows a diagrammatic sectional view of a wind turbine according to a first embodiment of the invention and FIG. 3 shows a perspective view of a wind turbine according to a second embodiment of the invention.

FIG. 2 shows a diagrammatic sectional view of a wind turbine according to a first embodiment of the invention. FIG. 2 shows a wind turbine with a tower 102 and a pod 104. At least one first fan 210 is provided in the lower region of the wind turbine, and a second fan 220 can be provided in the pod. The second fan 220 can be provided in the region of the generator of the wind turbine. For example an opening 101a can be provided in the lower region of the tower 102, through which outside air AL is drawn into the interior 102b of the tower 102 of the wind turbine 100, in particular by means of the fan 210. When the first fan 210 and the second fan 220 are activated smoke can be sucked away from the lower region of the tower 102 into the pod 104 and then out to the exterior. The pod 104 can have at least one opening 104a through which outside air AL can be drawn into the interior 104b of the pod. The wind turbine can include smoke detectors 310, 320 in the tower 102 and/or in the pod 104. As soon as the smoke detectors have detected smoke, operation of the wind turbine can be adapted. In particular the fans 210, 220 can be activated so that fresh outside air AL is sucked into the tower 102 through the opening 102a and the smoke R, which is in the interior of the tower and/or the pod 104, can for example be sucked away upwardly to the pod and then outwardly from the pod.

The wind turbine can have a control unit 400, which is coupled to the first and second fans 210, 220 and the smoke detectors 310, 320. When the smoke detectors 310, 320 signal smoke, the control unit 400 activates the first and/or second fan 310, 320. If the opening 102a and opening 104a are controllable, that is to say can be opened or closed, then those openings can be opened so that fresh air can be sucked in and the smoke can be sucked away.

A door 500 can be provided in the lower region of the tower 102a. When the door 500 is opened, that is to say when service or maintenance personnel enter the wind turbine, then the control unit 400 may stop operation of the wind turbine, that is to say the control of the rotor is stopped. Optionally, the maintenance personnel can actuate a maintenance switch so that the wind turbine is switched into a maintenance mode. If the control unit 400 then detects smoke formation within the tower and/or the pod 104 in the maintenance mode by means of the smoke detectors 310, 320, a warning signal is output so that the maintenance personnel can evacuate the wind turbine as quickly as possible. Furthermore operation of the first and second fans 210, 220 is activated to suck away the smoke in the wind turbine 100. This is particularly advantageous because in that way the risk of smoke poisoning for the maintenance personnel located in the wind turbine can be considerably reduced.

Optionally, the fan 210 or the fan 220 has an uninterruptible power supply. The smoke detectors 310, 320 may also have an uninterruptible power supply. Alternatively, the smoke detectors can have accumulators or batteries to be able to continue to operate.

Personnel safety within the wind turbine can also be improved in a fire situation by sucking away the smoke in the wind turbine. In that way the service personnel can be allowed more time for evacuation of the wind turbine.

Figure 3:
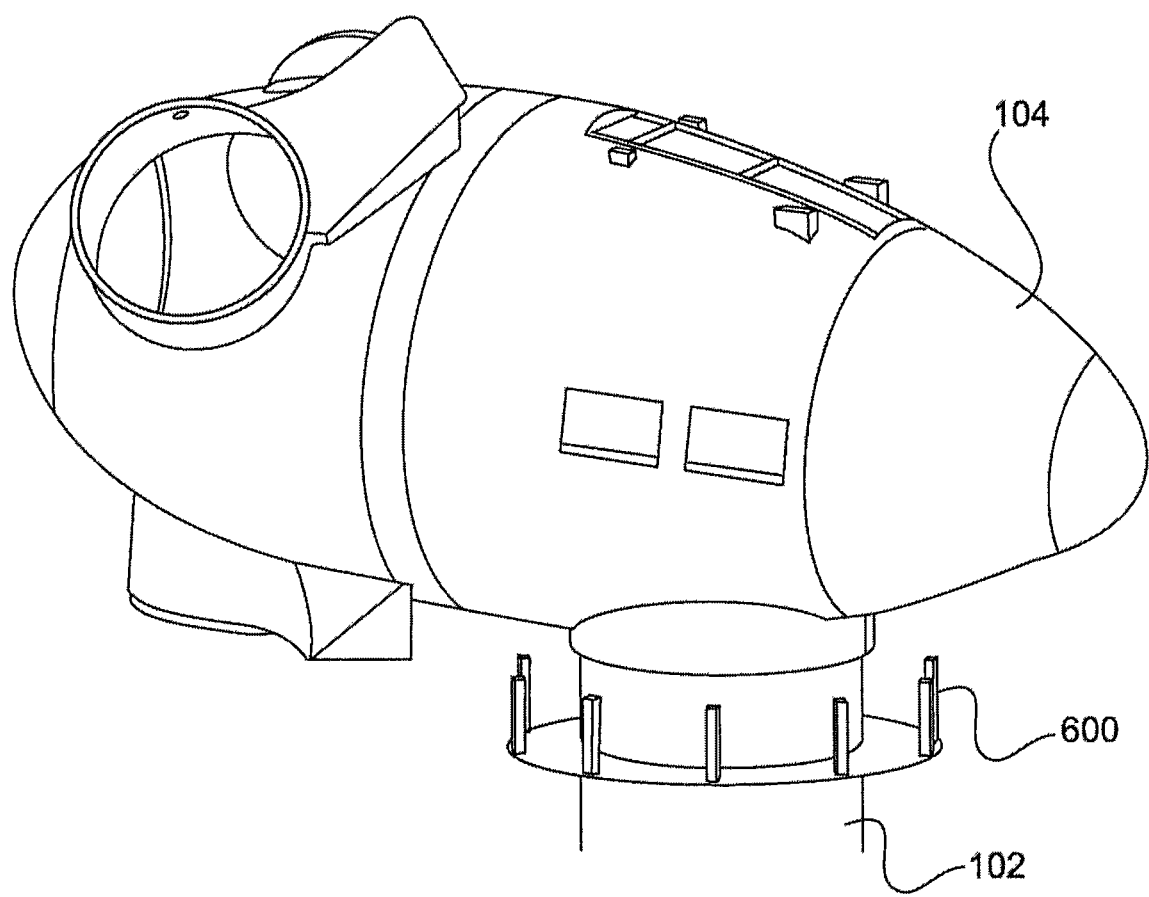

FIG. 3 shows a perspective view of a wind turbine according to a second embodiment of the invention. According to a second embodiment which is based on the first embodiment the wind turbine or the tower 102 of the wind turbine has at least one evacuation platform 600. The evacuation platform 600 is provided in particular in the upper region of the tower. If a fire situation comes about in the wind turbine and the service or maintenance personnel are not evacuated in good time then the maintenance or service personnel can take flight onto the evacuation platform 600. The personnel can then be evacuated.

The invention claimed is:

1. A wind turbine, comprising:
   a tower;
   a pod;
   one or more smoke detectors arranged in at least one region chosen among the tower and the pod;
   one or more fans arranged in at least one region chosen among the tower and the pod;
   a controller coupled to the one or more smoke detectors and the one or more fans, wherein the controller is configured to activate the one or more fans in response to the one or more smoke detectors detecting smoke; and
   an access door in the tower, wherein the controller is configured to control the one or more fans in dependence on at least one condition chosen among whether the access door has been opened and whether the wind turbine is in a maintenance mode.

2. The wind turbine according to claim 1, further comprising:
   an evacuation platform at the tower.

3. The wind turbine according to claim 1, further comprising:
   an opening in the tower and an opening in the pod.

4. The wind turbine according to claim 1, wherein the one or more smoke detectors include first and second smoke detectors, wherein the first smoke detector is located in the tower and the second smoke detector is located in the pod.

5. The wind turbine according to claim 1, wherein the one or more fans include first and second fans, wherein the first fan is located in the tower and the second fan is located in the pod.

6. The wind turbine according to claim 5, wherein the first fan is configured to cause air to flow from an environment outside the tower to inside of the tower by flowing through an opening in the tower.

7. The wind turbine according to claim 6, wherein the second fan is configured to cause air and smoke to flow from inside of the tower into the pod, wherein the pod includes one or more openings through which the air and the smoke exit the pod.

8. A method of sucking away smoke in a wind turbine, the wind turbine having a tower and a pod, the method comprising:
   detecting smoke by one or more smoke detectors in at least one region chosen among the tower and the pod;
   detecting whether there are people in the wind turbine or whether the wind turbine is in a maintenance mode; and
   activating one or more fans in at least one region chosen among the tower and the pod to cause the smoke to flow from inside the wind turbine to an environment outside of the wind turbine, wherein the one or more fans are controlled in dependence on at least one condition chosen among whether an access door to the tower is open and whether the wind turbine is in maintenance mode.

\* \* \* \* \*